United States Patent
Kaita et al.

(10) Patent No.: US 9,938,362 B2
(45) Date of Patent: Apr. 10, 2018

(54) ISOPRENE POLYMERIZATION CATALYST COMPOSITION, METHOD FOR PRODUCING SYNTHETIC POLYISOPRENE, AND SYNTHETIC POLYISOPRENE

(71) Applicant: BRIDGESTONE CORPORATION, Chuo-ku, Tokyo (JP)

(72) Inventors: Shojiro Kaita, Tokyo (JP); Satoru Tamaki, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 232 days.

(21) Appl. No.: 14/764,232

(22) PCT Filed: Feb. 14, 2014

(86) PCT No.: PCT/JP2014/000757
§ 371 (c)(1),
(2) Date: Jul. 29, 2015

(87) PCT Pub. No.: WO2014/125830
PCT Pub. Date: Aug. 21, 2014

(65) Prior Publication Data
US 2015/0368383 A1    Dec. 24, 2015

(30) Foreign Application Priority Data

Feb. 14, 2013  (JP) ................. 2013-026804

(51) Int. Cl.
| | | |
|---|---|---|
| *C08F 4/52* | (2006.01) | |
| *C08F 4/54* | (2006.01) | |
| *C08F 36/08* | (2006.01) | |
| *C08F 136/08* | (2006.01) | |
| *C08F 4/626* | (2006.01) | |

(52) U.S. Cl.
CPC .............. *C08F 136/08* (2013.01); *C08F 4/52* (2013.01); *C08F 4/54* (2013.01); *C08F 4/626* (2013.01); *C08F 36/08* (2013.01)

(58) Field of Classification Search
CPC .............. C08F 4/52; C08F 4/54; C08F 36/08
See application file for complete search history.

(56) References Cited

U.S. PATENT DOCUMENTS

| 4,433,107 A * | 2/1984 | Takeuchi ............... C08L 21/00 525/210 |
|---|---|---|
| 5,627,119 A | 5/1997 | Biagini et al. |
| 9,365,666 B2 * | 6/2016 | Kaita ...................... C08F 36/08 |
| 2005/0233894 A1 | 10/2005 | Kaita et al. |
| 2005/0261453 A1 | 11/2005 | Laubry et al. |
| 2011/0263803 A1 | 10/2011 | Suzuki et al. |
| 2012/0123070 A1 | 5/2012 | Boisson et al. |

FOREIGN PATENT DOCUMENTS

| CN | 1705687 A | 12/2005 |
|---|---|---|
| CN | 102245647 A | 11/2011 |
| JP | 2004-027179 A | 1/2004 |
| JP | 2006-503935 A | 2/2006 |
| JP | 3813926 B2 | 8/2006 |
| JP | 2007-161919 A | 6/2007 |
| JP | 2009-215431 A | 9/2009 |
| JP | 2012-525458 A | 10/2012 |
| JP | 2013-185057 A | 9/2013 |
| RU | 2141486 C1 | 11/1999 |
| WO | 2006/078021 A1 | 7/2006 |
| WO | 2010/0074255 A1 | 7/2010 |

OTHER PUBLICATIONS

M.J. Vitorino et al., "Isoprene polymerization using a neodymium phenolate pre-catalyst combined to aluminum based co-catalysts," European Polymer Journal (2012) vol. 48, pp. 1289-1294.
International Search Report for PCT/JP2014/000757 dated Apr. 15, 2014 [PCT/ISA/210].

* cited by examiner

*Primary Examiner* — Caixia Lu
(74) *Attorney, Agent, or Firm* — Sughrue Mion, PLLC

(57) ABSTRACT

An isoprene polymerization catalyst composition includes: Component (a): a rare earth element compound having a rare earth element-oxygen bond or a rare earth element-sulfur bond; Component (b): an ionic compound; and Component (c): at least one compound selected from the group consisting of a compound of formula (X): $YR^1_a R^2_b R^3_c$ and a compound having a repeating unit of formula (Y): $(-Y(R^1)O-)$ (where Y is a metal selected from groups 1, 2, 12 and 13 in a periodic table, $R^1$ and $R^2$ are C1-10 hydrocarbon groups or hydrogen atoms and $R^3$ is a C1-10 hydrocarbon group).

5 Claims, No Drawings

ISOPRENE POLYMERIZATION CATALYST COMPOSITION, METHOD FOR PRODUCING SYNTHETIC POLYISOPRENE, AND SYNTHETIC POLYISOPRENE

CROSS REFERENCE TO RELATED APPLICATIONS

This application is a National Stage of International Application No. PCT/JP2014/000757 filed Feb. 14, 2104, claiming priority based on Japanese Patent Application No. 2013-026804 filed Feb. 14, 2013, the contents of all of which are incorporated herein by reference in their entirety.

TECHNICAL FIELD

The disclosure relates to an isoprene polymerization catalyst composition, a method for producing a synthetic polyisoprene, and a synthetic polyisoprene produced by the method.

BACKGROUND

With social demands to save energy and resources in recent years, the need for durable tires has led to the need for rubber materials excellent in fracture resistance, wear resistance, and crack growth resistance. Natural rubber is known as rubber excellent in these properties. Given the high price of natural rubber, however, it is necessary to develop synthetic rubber that is as durable as natural rubber.

In order to bring the properties of synthetic polyisoprene closer to those of natural rubber for improved durability, efforts have been conventionally made to improve elongational crystallinity by making synthetic polyisoprene high-cis (for example, see Patent Literatures (PTL) 1 to 3). Although the durability of synthetic polyisoprene is improved in this way, there is a problem in that synthetic polyisoprene is less durable than natural rubber under high severity conditions.

It has been found difficult to efficiently manufacture a high molecular weight polymer for a polymer having an isoprene skeleton, as compared with a polymer composed of another monomer. This is likely to be the cause of lower durability under high severity conditions.

CITATION LIST

Patent Literatures

PTL 1: JP 2004-27179 A
PTL 2: the pamphlet of WO 2006-078021 A1
PTL 3: JP 3813926 B2

SUMMARY

Technical Problem

It could be helpful to provide a polymerization catalyst composition that enables efficient synthesis of high molecular weight polyisoprene. It could also be helpful to provide a method for producing a synthetic polyisoprene by which high molecular weight synthetic polyisoprene can be obtained efficiently, and the synthetic polyisoprene.

Solution to Problem

We thus provide the following.
An isoprene polymerization catalyst composition includes:
a component (a): a rare earth element compound having a rare earth element-oxygen bond or a rare earth element-sulfur bond;
a component (b): an ionic compound; and
a component (c): at least one compound selected from the group consisting of a compound represented by the following general formula (X) and a compound having a repeating unit represented by the following general formula (Y):

$$YR^1_a R^2_b R^3_c \quad (X)$$

$$(-Y(R^1)O-) \quad (Y)$$

where Y is a metal selected from groups 1, 2, 12 and 13 in a periodic table, $R^1$ and $R^2$ are hydrocarbon groups with a carbon number of 1 to 10 or hydrogen atoms and $R^3$ is a hydrocarbon group with a carbon number of 1 to 10 where $R^1$, $R^2$ and $R^3$ are the same or different, and a=1, b=0, and c=0 in the case where Y is the metal selected from the group 1 in the periodic table, a=1, b=1, and c=0 in the case where Y is the metal selected from the groups 2 and 12 in the periodic table, and a=1, b=1, and c=1 in the case where Y is the metal selected from the group 13 in the periodic table.

The use of the polymerization catalyst composition enables efficient synthesis of high molecular weight polyisoprene.

In this description, the term "rare earth element compound" means a compound containing a lanthanoid element composed of any of the elements with atomic numbers 57 to 71 in the periodic table, scandium, or yttrium.

In this description, the term "synthetic polyisoprene" means an isoprene homopolymer generated by polymerizing (synthesizing) isoprene as a monomer, and includes a polymer whose polymer chain has been partially modified.

A method for producing a synthetic polyisoprene includes polymerizing an isoprene monomer in the presence of the polymerization catalyst composition including the components (a), (b), and (c). High molecular weight polyisoprene can be synthesized efficiently by this producing method.

Advantageous Effect

It is thus possible to provide an isoprene polymerization catalyst composition that enables efficient synthesis of high molecular weight polyisoprene. It is also possible to provide a method of manufacturing synthetic polyisoprene by which high molecular weight synthetic polyisoprene can be obtained efficiently, and the synthetic polyisoprene.

DETAILED DESCRIPTION (Synthetic Polyisoprene)
A polymer produced using the disclosed polymerization catalyst composition is synthetic polyisoprene.
Cis-1,4 Bond Content
The cis-1,4 bond content of the synthetic polyisoprene is not particularly limited, and may be selected as appropriate according to the purpose. The cis-1,4 bond content is preferably 95% or more, more preferably 97% or more, and even more preferably 98% or more.

When the cis-1,4 bond content is 95% or more, the orientation of the polymer chain is good, and sufficient elongational crystallinity can be obtained. When the cis-1,4 bond content is 98% or more, sufficient elongational crystallinity to attain higher durability can be obtained.

Trans-1,4 Bond Content

The trans-1,4 bond content of the synthetic polyisoprene is not particularly limited, and may be selected as appropriate according to the purpose. The trans-1,4 bond content is preferably less than 5%, more preferably less than 3%, and even more preferably less than 1%.

When the trans-1,4 bond content is less than 5%, elongational crystallinity is unlikely to be inhibited.

3,4-Vinyl Bond Content

The 3,4-vinyl bond content of the synthetic polyisoprene is not particularly limited, and may be selected as appropriate according to the purpose. The 3,4-vinyl bond content is preferably 5% or less, more preferably 3% or less, and even more preferably 1% or less.

When the 3,4-vinyl bond content is 5% or less, elongational crystallinity is unlikely to be inhibited.

Weight Average Molecular Weight (Mw)

The weight average molecular weight (Mw) of the polyisoprene is preferably 1,000,000 or more, and more preferably 1,500,000 or more.

Number Average Molecular Weight (Mn)

The number average molecular weight (Mn) of the polyisoprene is preferably 400,000 or more, and more preferably 500,000 or more. By using the synthetic polyisoprene having such number average molecular weight, a rubber composition that exhibits good durability even under high severity conditions can be produced.

Residual Catalyst Content

The residual catalyst content of the polyisoprene is preferably 600 ppm or less, and more preferably 200 ppm or less. When the residual catalyst content is 600 ppm or less, the durability under high severity conditions is good. Here, the residual catalyst content specifically means the measured value of the rare earth element compound remaining in the polyisoprene.

(Method for Producing Synthetic Polyisoprene)

The method for producing the above-mentioned synthetic polyisoprene is described in detail below. Note that the producing method described in detail below is merely an example.

The synthetic polyisoprene producing method includes at least a polymerization step, and further includes a coupling step, a cleaning step, and other steps selected as appropriate according to need.

Polymerization Step

The polymerization step is a step of polymerizing an isoprene monomer.

In the polymerization step, isoprene as a monomer can be polymerized in the same way as a typical polymer producing method using a coordinated ionic polymerization catalyst, except that the disclosed polymerization catalyst composition is used. The polymerization catalyst or polymerization catalyst composition used here will be described in detail later.

Any polymerization method, such as solution polymerization, suspension polymerization, liquid phase bulk polymerization, emulsion polymerization, vapor phase polymerization, or solid phase polymerization, may be used. In the case of using a solvent in the polymerization reaction, any solvent inactive in the polymerization reaction may be used. Examples of such a solvent include n-hexane, toluene, cyclohexane, and a mixture thereof. The use of cyclohexane, n-hexane, or a mixture thereof is preferable especially in terms of environmental load, cost, and the like. The use of cyclohexane is further preferable for its advantages such as a lower boiling point than that of toluene and low toxicity.

When using the polymerization catalyst composition in the polymerization step, for example, (1) the components of the polymerization catalyst composition may be separately provided in a polymerization reaction system that includes isoprene as a monomer, to form the polymerization catalyst composition in the reaction system, or (2) the polymerization catalyst composition prepared beforehand may be provided in the polymerization reaction system.

In the polymerization step, polymerization may be stopped using a polymerization terminator such as methanol, ethanol, or isopropanol.

In the polymerization step, the polymerization reaction of isoprene is preferably performed under an atmosphere of inert gas. The inert gas is preferably nitrogen gas or argon gas. The polymerization temperature of the polymerization reaction is not particularly limited. The polymerization temperature is preferably in the range of, for example, −100° C. to 200° C., and may be approximately the ambient temperature. Note that the cis-1,4 selectivity of the polymerization reaction might decrease if the polymerization temperature is increased. The pressure of the polymerization reaction is preferably in the range of 0.1 MPa to 10.0 MPa, to take sufficient isoprene into the polymerization reaction system. The reaction time of the polymerization reaction is not particularly limited. The reaction time is preferably in the range of, for example, 1 second to 10 days, though the reaction time may be selected as appropriate according to conditions such as the catalyst type and the polymerization temperature.

Polymerization Catalyst Composition

The following describes the polymerization catalyst composition.

The catalytic activity of the polymerization catalyst composition is preferably 30 kg/mol·h or more, and more preferably 1000 kg/mol·h or more. When the catalytic activity is 30 kg/mol·h or more, polyisoprene can be synthesized efficiently. The value of the catalytic activity mentioned here indicates the ability to produce a polyisoprene per unit mole of catalyst and unit time.

The polymerization catalyst composition includes at least:

a component (a): a rare earth element compound having a rare earth element-oxygen bond or a rare earth element-sulfur bond;

a component (b): an ionic compound; and a component (c): at least one compound selected from the group consisting of a compound represented by the following general formula (X) and a compound having a repeating unit represented by the following general formula (Y):

$$YR^1_a R^2_b R^3_c \quad (X)$$

$$(-Y(R^1)O-) \quad (Y)$$

(where Y is a metal selected from groups 1, 2, 12 and 13 in the periodic table, $R^1$ and $R^2$ are hydrocarbon groups with a carbon number of 1 to 10 or hydrogen atoms and $R^3$ is a hydrocarbon group with a carbon number of 1 to 10 where $R^1$, $R^2$ and $R^3$ may be the same or different, and a=1, b=0, and c=0 in the case where Y is the metal selected from the group 1 in the periodic table, a=1, b=1, and c=0 in the case where Y is the metal selected from the groups 2 and 12 in the periodic table, and a=1, b=1, and c=1 in the case where Y is the metal selected from the group 13 in the periodic table).

The component (a) also includes a reaction product of a rare earth element compound and a Lewis base.

The component (b) includes an ionic compound made up of a non-coordinating anion and a cation.

The polymerization catalyst composition may further include a halogen compound. The halogen compound includes at least one selected from a Lewis acid, a complex compound of a metal halide and a Lewis base, and an organic compound including an active halogen.

The polymerization catalyst composition may also include a compound (component (d)) capable of being an anionic ligand.

The component (a) is not particularly limited as long as it has a rare earth element-oxygen bond or a rare earth element-sulfur bond. As the compound having the rare earth element-oxygen bond, at least one of the following compounds (I) to (IV) is preferably used. In the formulas (I) to (IV), R groups may be the same or different and indicate C1-C10 alkyl groups, M is a rare earth element, X is chlorine, bromine, or iodine, and y is 1 to 6. In detail, the compounds are:

rare earth alcoholate represented by

(RO)$_3$M (I);

rare earth carboxylate represented by

(R—CO$_2$)$_3$M (II);

a complex compound of diketone and rare earth represented by

[Chem. 1]

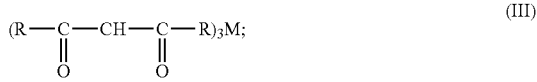

(III)

and an adduct compound to rare earth halide having an oxygen donor compound represented by

MX$_3$·y oxygen donor (IV).

As the compound having the rare earth element-sulfur bond, at least one of:

rare earth alkylthiolate represented by

(RS)$_3$M (V);

a compound represented by

(R—CS$_2$)$_3$M (VI);

a compound represented by

[Chem. 2]

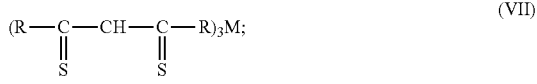

(VII)

and an adduct compound to rare earth halide having a sulfur donor compound represented by

MX$_3$·y sulfur donor (VIII)

is preferably used.

The component (a) preferably does not have a rare earth element-carbon bond as mentioned below, and accordingly the compound expressed by (V) or (VI) is preferable.

In the polymerization reaction system, the molar quantity of the component (a) included in the polymerization catalyst composition is preferably 1/5000 or less and more preferably 1/10000 or less that of the isoprene monomer added subsequently. In detail, the concentration is preferably in the range of 0.1 mol/l to 0.0001 mol/l. By setting such a molar ratio, not only the cis-1,4 bond content is improved but also the catalytic activity is improved, with it being possible to significantly reduce the residual catalyst content in the synthetic polyisoprene. Blending such polyisoprene into a rubber composition improves durability.

The component (a) used in the polymerization catalyst composition is a rare earth element compound or a reaction product of the rare earth element compound and a Lewis base. The rare earth element compound or the reaction product of the rare earth element compound and the Lewis base preferably does not have a rare earth element-carbon bond. In the case where the rare earth element compound or the reaction product does not have a rare earth element-carbon bond, the compound is stable and easy to handle. Here, the "rare earth element compound" is a compound containing a lanthanoid element composed of any of the elements with atomic numbers 57 to 71 in the periodic table, scandium, or yttrium.

Specific examples of the lanthanoid element include lanthanum, cerium, praseodymium, neodymium, promethium, samarium, europium, gadolinium, terbium, dysprosium, holmium, erbium, thulium, ytterbium, and lutetium. The component (a) may be a single kind, or a combination of two or more kinds.

In the component (a) used in the polymerization catalyst composition, examples of the Lewis base that reacts with the rare earth element compound include tetrahydrofuran, diethylether, dimethylaniline, trimethylphosphine, lithium chloride, neutral olefins, and neutral diolefins.

The component (b) used in the polymerization catalyst composition is an ionic compound.

The ionic compound is, for example, an ionic compound that is made up of a non-coordinating anion and a cation and can generate a cationic transition metal compound by reacting with the rare earth element compound or its reaction product with the Lewis base as the component (a). The non-coordinating anion may be a tetravalent boron anion. Examples include tetraphenylborate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (triphenyl, pentafluorophenyl)borate, [tris(pentafluorophenyl), phenyl]borate, and tridecahydride-7,8-dicarbaundecaborate. A preferable example is tetrakis(pentafluorophenyl)borate. Examples of the cation include carbonium cation, oxonium cation, ammonium cation, phosphonium cation, cycloheptatrienyl cation, and ferrocenium cation having transition metal. Specific examples of the carbonium cation include trisubstituted carbonium cation such as triphenylcarbonium cation or tri(substituted phenyl)carbonium cation. Specific examples of the tri(substituted phenyl)carbonium cation include tri(methylphenyl)carbonium cation and tri(dimethylphenyl)carbonium cation. Specific examples of the ammonium cation include: trialkylammonium cation such as trimethylammonium cation, triethylammonium cation, tripropylammonium cation, or tributylammonium cation (e.g. tri(n-butyl)ammonium cation); N,N-dialkylanilinium cation such as N,N-dimethylanilinium cation, N,N-diethylanilinium cation, or N,N-2,4,6-pentamethylanilinium cation; and dialkylammonium cation such as diisopropylammonium cation or dicyclohexylammonium cation. Specific examples of the phosphonium cation include triarylphosphonium cation such as triphenylphosphonium cation, tri(methylphenyl)phosphonium cation, or tri(dimethylphenyl)phosphonium cation. Thus, the ionic compound is preferably a compound that combines the non-coordinating anion and the cation respectively selected from the above. In detail, N,N-dimethylaniliniumtetrakis (pentafluorophenyl)borate, triphenylcarboniumtetrakis(pentafluorophenyl)borate, or the like is preferable. The ionic compound may be a single kind or a combination of two or more kinds. The content of the ionic compound in the polymerization catalyst composition is preferably 0.1 to 10 times in mole and more preferably about 1 time in mole with respect to the component (a).

The halogen compound includes at least one selected from a Lewis acid, a complex compound of a metal halide and a Lewis base, and an organic compound including an active halogen. For example, the halogen compound reacts with the rare earth element compound or its reaction product with the Lewis base as the component (a), to generate a cationic transition metal compound, a halogenated transition metal compound, or a compound with a charge-deficient transition metal center. In the case of using the halogen compound, the total content of the halogen compound in the polymerization catalyst composition is preferably 1 to 5 times in mole with respect to the component (a).

The Lewis acid may be a boron-containing halogen compound such as $B(C_6F_5)_3$, an aluminum-containing halogen compound such as $Al(C_6F_5)_3$, or a halogen compound containing an element belonging to group 3, 4, 5, 6, or 8 in the periodic table. Aluminum halide or organic metal halide is preferable. The halogen element is preferably chlorine or bromine. Specific examples of the Lewis acid include methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribromide, antimony trichloride, antimony pentachloride, phosphorous trichloride, phosphorous pentachloride, tin tetrachloride, titanium tetrachloride, and tungsten hexachloride. Of these, diethylaluminum chloride, ethylaluminum sesquichloride, ethylaluminum dichloride, diethylaluminum bromide, ethylaluminum sesquibromide, and ethylaluminum dibromide are particularly preferable.

Examples of the metal halide in the complex compound of the metal halide and the Lewis base include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, and gold bromide. Of these, magnesium chloride, calcium chloride, barium chloride, manganese chloride, zinc chloride, and copper chloride are preferable, and magnesium chloride, manganese chloride, zinc chloride, and copper chloride are particularly preferable.

The Lewis base in the complex compound of the metal halide and the Lewis base is preferably a phosphorous compound, a carbonyl compound, a nitrogen compound, an ether compound, alcohol, or the like. Specific examples include tributyl phosphate, tri-2-ethylhexyl phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid, versatic acid, triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, and lauryl alcohol. Of these, tri-2-ethylhexyl phosphate, tricresyl phosphate, acetylacetone, 2-ethylhexanoic acid, versatic acid, 2-ethylhexyl alcohol, 1-decanol, and lauryl alcohol are preferable.

The Lewis base reacts in proportion of 0.01 mol to 30 mol and preferably 0.5 mol to 10 mol, per mol of the metal halide. The use of the reaction product with the Lewis base reduces the metal remaining in the polymer.

The organic compound including the active halogen is benzyl chloride or the like.

The component (c) used in the polymerization catalyst composition is at least one organometallic compound selected from the group consisting of a compound represented by the following general formula (X) and a compound having a repeating unit represented by the following general formula (Y):

$$YR^1_a R^2_b R^3_c \qquad \text{(X)}$$

$$(-Y(R^1)O-) \qquad \text{(Y)}$$

(where Y is a metal selected from groups 1, 2, 12 and 13 in the periodic table, $R^1$ and $R^2$ are hydrocarbon groups with a carbon number of 1 to 10 or hydrogen atoms and $R^3$ is a hydrocarbon group with a carbon number of 1 to 10 where $R^1$, $R^2$ and $R^3$ may be the same or different, and a=1, b=0, and c=0 in the case where Y is the metal selected from the group 1 in the periodic table, a=1, b=1, and c=0 in the case where Y is the metal selected from the groups 2 and 12 in the periodic table, and a=1, b=1, and c=1 in the case where Y is the metal selected from the group 13 in the periodic table).

The compound represented by the general formula (X) is preferably an organoaluminum compound represented by the following general formula (Xa):

$$AlR^1R^2R^3 \qquad \text{(Xa)}$$

(where $R^1$ and $R^2$ are hydrocarbon groups with a carbon number of 1 to 10 or hydrogen atoms, and $R^3$ is a hydrocarbon group with a carbon number of 1 to 10, where $R^1$, $R^2$ and $R^3$ may be the same as or different). Examples of the organoaluminum compound having the general formula (Xa) include: trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; diethylaluminum hydride, di-n-propylaluminum hydride, di-n-butylaluminum hydride, diisobutylaluminum hydride, dihexylaluminum hydride, diisohexylaluminum hydride, dioctylaluminum hydride, and diisooctylaluminum hydride; and ethylaluminum dihydride, n-propylaluminum dihydride, and isobutylaluminum dihydride. Of these, triethylaluminum, triisobutylaluminum, diethylaluminum hydride, and diisobutylaluminum hydride are preferable. The organoaluminum compound as the component (c) mentioned above may be a single kind, or a combination of two or more kinds. The content of the component (c) in the polymerization catalyst composition is preferably 10 times or more and more preferably 20 to 1000 times in mole with respect to the component (a). The content of the component (c) is preferably 1/5000 or more and more preferably 1/3000 to 1/10 the molar quantity of the isoprene monomer added subsequently. By setting such a molar ratio, not only the cis-1,4 bond content is improved but also the catalytic activity is improved, with it being possible to significantly reduce the residual catalyst content in the synthetic polyisoprene. Blending such polyisoprene into a rubber composition improves durability.

The compound represented by the general formula (Y) is preferably chain aluminoxane or cyclic aluminoxane having a repeating unit represented by a general formula (—Al(R')O—) (where R' is a hydrocarbon group with a carbon number of 1 to 10, a part of the hydrocarbon group may be substituted by a halogen atom and/or an alkoxy group, and the polymerization degree of the repeating unit is preferably 5 or more and more preferably 10 or more). Specific examples of R' include a methyl group, an ethyl group, a propyl group, and an isobutyl group. Of these, a methyl group is preferable. Examples of the organoaluminum compound used as the starting material of the aluminoxane include trialkylaluminum such as trimethylaluminum, triethylaluminum, and triisobutylaluminum and a mixture thereof. Trimethylaluminum is particularly preferable. For example, aluminoxane obtained using a mixture of trimethylaluminum and tributylaluminum as the starting material is suitably used. The content of the aluminoxane in the polymerization catalyst composition is preferably set so that the element ratio Al/M between the rare earth element M in the component (a) and the aluminum element Al in the aluminoxane is about 10 to 1000.

Compound Capable of being an Anionic Ligand

The compound (component (d)) capable of being an anionic ligand is not particularly limited as long as it is exchangeable with an oxygen atom or sulfur atom of the component (a), but preferably has any of a OH group, a NH group, and a SH group.

The compound having a OH group is, for example, aliphatic alcohol or aromatic alcohol. Specific examples include dibutylhydroxytoluene, alkylated phenol, 4,4'-thiobis-(6-t-butyl-3-methylphenol), 4,4'-butylidenebis-(6-t-butyl-3-methylphenol), 2,2'-methylenebis-(4-methyl-6-t-butylphenol), 2,2'-methylenebis-(4-ethyl-6-t-butylphenol), 2,6-di-t-4-ethylphenol, 1,1,3-tris-(2-methyl-4-hydroxy-5-t-butylphenyl)butane, n-octadecyl-3-(4-hydroxy-3,5-di-t-butylphenyl)propionate, tetrakis[methylene-3-(3,5-di-t-butyl-4-hydroxyphenyl)propionate]methane, dilaurylthiodipropionate, distearylthiodipropionate, and dimyristyrylthiopropionate, though the compound is not limited to these.

Specific examples of a hindered phenol-based compound include triethyleneglycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis-(n-octylthio)-6-(4-hydroxy-3,5-di-t-butylanilino)-1,3,5-triazine, pentaerythryl-tetrakis[3-(3,5-di-t-butyl-4-hydroxyphenyl)propionate], 2,2-thio-diethylenebis[3-(3,5-di-t-butyl-4-hydroxyphenyl)propionate], octadecyl-3-(3,5-di-t-butyl-4-hydroxyphenyl)propionate, N,N'-hexamethylenebis(3,5-di-t-butyl-4-hydroxy-hydrocinnamamide), 3,5-t-butyl-4-hydroxybenzylphosphonate-diethylester, 1,3,5-trimethyl-2,4,6-tris(3,5-di-t-butyl-4-hydroxybenzyl)benzene, tris-(3,5-di-t-butyl-4-hydroxybenzyl)-isocyanurate, octylated diphenylamine, and 2,4-bis[(octylthio)methyl]-o-cresol.

Examples of a hydrazine-based compound include N,N'-bis[3-(3,5-di-t-butyl-4-hydroxyphenyl)propionyl]hydrazine.

The compound having a NH group is, for example, a primary amine or secondary amine of alkylamine or arylamine. Specific examples include dimethylamine, diethylamine, pyrrole, ethanolamine, diethanolamine, dicyclohexylamine, N,N'-dibenzylethylenediamine, and bis(2-diphenylphosphinophenyl)amine.

The compound having a SH group is, for example, aliphatic thiol, aromatic thiol, or any of the compounds represented by the following general formulas (i) and (ii).

[Chem. 3]

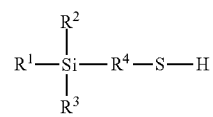

(i)

(where $R^1$, $R^2$ and $R^3$ are each independently represented by —O—$C_jH_{2j+1}$, —(O—$C_kH_{2k}$—)$_a$—O—$C_mH_{2m+1}$, or —$C_nH_{2n+1}$ with at least one of $R^1$, $R^2$ and $R^3$ being —(O—$C_kH_{2k}$—)$_a$—O—$C_mH_{2m+1}$, j, m and n are each independently 0 to 12, k and a are each independently 1 to 12, and $R^4$ is a linear, branched, or cyclic, saturated or unsaturated alkylene group, cycloalkylene group, cycloalkylalkylene group, cycloalkenylalkylene group, alkenylene group, cycloalkenylene group, cycloalkylalkenylene group, cycloalkenylalkenylene group, arylene group, or aralkylene group with a carbon number of 1 to 12).

Specific examples of the compound represented by the general formula (i) include 3-mercaptopropyltrimethoxysilane, 3-mercaptopropyltriethoxysilane, 3-mercaptopropylmethyldimethoxysilane, (mercaptomethyl)dimethylethoxysilane, and mercaptomethyltrimethoxysilane.

[Chem. 4]

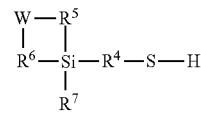

(ii)

(where W is —$NR^8$—, —O—, or —$CR^9R^{10}$— (where $R^8$ and $R^9$ are —$C_pH_{2p+1}$, $R^{10}$ is —$C_qH_{2q+1}$, and p and q are each independently 0 to 20), $R^5$ and $R^6$ are each independently —M—$C_rH_{2r}$— (where M is —O— or —$CH_2$—, and r is 1 to 20), $R^7$ is —O—$C_jH_{2j+1}$, —(O—$C_k$—)$_a$—O—$C_mH_{2m+1}$, or —$C_nH_{2n+1}$, j, m and n are each independently 0 to 12, k and a are each independently 1 to 12, and $R^4$ is the same as $R^4$ in the formula (i)).

Specific examples of the compound represented by the general formula (ii) include 3-mercaptopropyl(ethoxy)-1,3-dioxa-6-methylaza-2-silacyclooctane, 3-mercaptopropyl(ethoxy)-1,3-dioxa-6-butylaza-2-silacyclooctane, and 3-mercaptopropyl(ethoxy)-1,3-dioxa-6-dodecylaza-2-silacyclooctane.

The component (d) is preferably an anionic tridentate ligand precursor represented by the following general formula (iii):

$$E^1\text{-}T^1\text{-}X\text{-}T^2\text{-}E^2 \quad \text{(iii)}$$

(where X is an anionic electron donating group including a coordinating atom selected from atoms of group 15, $E^1$ and $E^2$ are each independently a neutral electron donating group including a coordinating atom selected from atoms of groups 15 and 16, and $T^1$ and $T^2$ are crosslinking groups for crosslinking X with $E^1$ and $E^2$).

The additive amount of the component (d) is preferably 0.01 mol to 10 mol and more preferably 0.1 mol to 1.2 mol, with respect to 1 mol the rare earth element compound (component (a)). When the additive amount is 0.1 mol or more, the catalytic activity is sufficiently high, so that polyisoprene can be synthesized efficiently. Although the additive amount is preferably equivalent (1.0 mol) to the rare earth element compound, the component (d) may be added excessively. The additive amount exceeding 1.2 mol is, however, not preferable because of significant reagent loss.

In the general formula (iii), the neutral electron donating groups $E^1$ and $E^2$ are each a group including a coordinating atom selected from groups 15 and 16. $E^1$ and $E^2$ may be the same group or different groups. Examples of the coordinating atom include nitrogen N, phosphorus P, oxygen O, and sulfur S. The coordinating atom is preferably P.

In the case where the coordinating atom included in $E^1$ and $E^2$ is P, examples of the neutral electron donating groups $E^1$ and $E^2$ include: 1) a diarylphosphino group such as a diphenylphosphino group or a ditolylphosphino group; 2) a dialkylphosphino group such as a dimethylphosphino group or a diethylphosphino group; and 3) an alkylarylphosphino group such as a methylphenylphosphino group. A preferable example is a diarylphosphino group.

In the case where the coordinating atom included in $E^1$ and $E^2$ is N, examples of the neutral electron donating groups $E^1$ and $E^2$ include: 1) a dialkylamino group such as a dimethylamino group, a diethylamino group, or a bis(trimethylsilyl)amino group; 2) a diarylamino group such as a diphenylamino group; and 3) an alkylarylamino group such as a methylphenyl group.

In the case where the coordinating atom included in $E^1$ and $E^2$ is O, examples of the neutral electron donating groups $E^1$ and $E^2$ include: 1) an alkoxy group such as a methoxy group, an ethoxy group, a propoxy group, or a butoxy group; and 2) an aryloxy group such as a phenoxy group or a 2,6-dimethylphenoxy group.

In the case where the coordinating atom included in $E^1$ and $E^2$ is S, examples of the neutral electron donating groups $E^1$ and $E^2$ include: 1) an alkylthio group such as a methylthio group, an ethylthio group, a propylthio group, or a butylthio group; and 2) an arylthio group such as a phenylthio group or a tolylthio group.

The anionic electron donating group X is a group including a coordinating atom selected from group 15. The coordinating atom is preferably phosphorus P or nitrogen N, and more preferably N.

The crosslinking groups $T^1$ and $T^2$ are any groups capable of crosslinking X with $E^1$ and $E^2$. Examples include an arylene group that may have a substituent on an aryl ring. $T^1$ and $T^2$ may be the same group or different groups.

The arylene group may be a phenylene group, a naphthylene group, a pyridylene group, a thienylene group, or the like (preferably a phenylene group or a naphthylene group). Any group may be a substituent on an aryl ring of the arylene group. Examples of the substituent include an alkyl group such as a methyl group or an ethyl group, an aryl group such as a phenyl group or a tolyl group, a halogen group such as fluoro, chloro, or bromo, and a silyl group such as a trimethylsilyl group.

A more preferable example of the arylene group is a 1,2-phenylene group.

A preferable example of the anionic tridentate ligand precursor is represented by the following general formula (iv). This can be, for example, produced by the method described in the following Examples or with reference to Organometallics, 23, p. 4778-4787 (2004) or the like.

[Chem. 5]

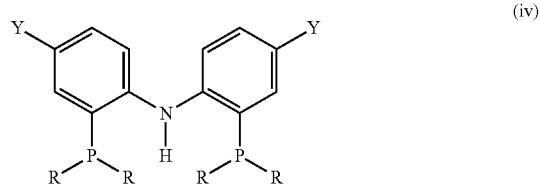

(iv)

(where R is an alkyl group or an aryl group, and Y is hydrogen, an alkyl group, a halogeno group, a silyl group, or the like).

In more detail, a PNP ligand precursor such as bis(2-diphenylphosphinophenyl)amine may be used.

(Rubber Composition)

The synthetic polyisoprene produced using the disclosed isoprene polymerization catalyst composition can be suitably used in a rubber composition. The rubber composition includes at least a rubber component, and further includes other components such as a filler and a crosslinker according to need.

The amount (content) of the synthetic polyisoprene in the rubber component is not particularly limited and may be selected as appropriate according to the purpose. The amount is preferably 15 mass % to 100 mass %.

When the amount of the synthetic polyisoprene in the rubber component is 15 mass % or more, the synthetic polyisoprene produces sufficient effects.

(Use)

The rubber composition or the crosslinked rubber composition can be used in tires. Applying the rubber composition or the crosslinked rubber composition to the tread of the tire is advantageous in terms of durability. The rubber composition or the crosslinked rubber composition may be used not only in tires but also in anti-vibration rubber, seismic isolation rubber, belts (conveyor belts), rubber crawlers, various hoses, etc.

EXAMPLES

Non-limiting examples according to the disclosure are described below.

Example 1

Production Method of Synthetic Polyisoprene A

In a glove box in a nitrogen atmosphere, 7.9 µmol gadolinium tris(tert-butoxide) (Gd(OtBu)$_3$) (component (a)), 1.19 mmol triisobutylaluminum (component (c)), and 5.0 g toluene were charged into a 1 L pressure-proof glass reactor. After aging for 30 minutes, 7.9 µmol triphenylcarbonium tetrakis(pentafluorophenyl)borate (Ph$_3$CB(C$_6$F$_5$)$_4$) (component (b)) was added and aged for 15 minutes. The reactor was then taken out of the glove box, 235.0 g cyclohexane and 70 g isoprene were added, and the polymerization reaction was performed at 25° C. for 15 hours.

After the polymerization, 1 mL an isopropanol solution with 5 mass % 2,2'-methylene-bis(4-ethyl-6-t-butylphenol) (NS-5) was added to stop the reaction. Further, the polymer was separated using a large amount of methanol and vacuum-dried at 70° C., to obtain a synthetic polyisoprene A. The yield of the obtained synthetic polyisoprene A was 45 g.

Example 2

Production Method of Synthetic Polyisoprene B

The same method as in Example 1 was used except that the polymerization was performed at 50° C. for 2 hours. As a result, a synthetic polyisoprene B was obtained with a yield of 68 g.

Example 3

Production Method of Synthetic Polyisoprene C

In a glove box in a nitrogen atmosphere, 7.9 µmol gadolinium tris(tert-butoxide) (Gd(OtBu)$_3$) (component (a)), 7.9 µmol 2-ethyl-1-hexanol (component (d)), 1.19 mmol triisobutylaluminum (component (c)), and 5.0 g toluene were charged into a 1 L pressure-proof glass reactor. After aging for 30 minutes, 7.9 µmol triphenylcarbonium tetrakis(pentafluorophenyl)borate (Ph$_3$CB(C$_6$F$_5$)$_4$) (component (b)) was added and aged for 15 minutes. The reactor was then taken out of the glove box, 235.0 g cyclohexane and 70 g isoprene were added, and the polymerization reaction was performed at 50° C. for 2 hours. After the polymerization, 1 mL an isopropanol solution with 5 mass % 2,2'-methylene-bis(4-ethyl-6-t-butylphenol) (NS-5) was added to stop the reaction. Further, the polymer was separated using a large amount of methanol and vacuum-dried at 70° C., to obtain a synthetic polyisoprene C. The yield of the obtained synthetic polyisoprene C was 69 g.

Comparative Example 1

Production Method of Synthetic Polyisoprene X

In a glove box in a nitrogen atmosphere, 0.05 mmol dimethylaluminum (µ-dimethyl)bis(pentamethylcyclopentadienyl) gadolinium [(Cp*)$_2$Gd(µ-Me)$_2$AlMe$_2$] was charged into a sufficiently dried 100 ml pressure-proof glass bottle, and dissolved with 34.0 ml toluene. Next, 1.5 mmol triisobutylaluminum and 0.05 mmol triphenylcarbonium tetrakis(pentafluorophenyl)borate (Ph$_3$CB(C$_6$F$_5$)$_4$) were added, and the bottle was capped. After the reaction at the ambient temperature for 1 hour, the bottle was taken out of the glove box, 1.0 ml isoprene was charged, and polymerization was performed at −40° C. for 15 hours. After the polymerization, 10 ml a methanol solution with 10 wt % 2,6-bis(t-butyl)-4-methylphenol was added to stop the reaction. Further, the polymer was separated using a large amount of a methanol/hydrochloric acid mixture solvent, and vacuum-dried at 60° C. The yield of the obtained polymer X was 100%.

Comparative Example 2

Production Method of Synthetic Polyisoprene Y

In a glove box, a magnetic stirrer was put in a flask (100 mL), and isoprene (2.04 g, 30.0 mmol) and a chlorobenzene solution (16 mL) of [Y(CH$_2$C$_6$H$_4$NMe$_2$-o)$_2$(PNP)] (12.5 µmol) were added. After this, a chlorobenzene solution (4 mL) of [PhMe$_2$NH][B(C$_6$F$_5$)$_4$] (12.5 µmol) was added under high-speed stirring. Stirring was performed at the ambient temperature for 5 minutes to cause the reaction, and then methanol was added to end the polymerization. The reaction solution was poured into a 200 mL a methanol solution including a small amount of hydrochloric acid and butyl-hydroxytoluene (stabilizer). The precipitated polymer product was isolated by decantation, cleaned with methanol, and dried at 60° C. to obtain a polymer Y (yield: 100%).

Comparative Example 3

Production Method of Synthetic Polyisoprene Z

The polymerization reaction was performed under the same conditions as test C described in PTL 3, to obtain a polymer Z.

(Physical Property Testing for Synthetic Polyisoprene)
The following physical property testing was performed on the synthetic polyisoprene A to C and X to Z.
(1) Microstructure (Cis-1,4 Bond Content)
Regarding the synthetic polyisoprene A to C and X to Z, the cis-1,4 bond content was determined from the integration ratio of the peaks obtained according to $^1$H-NMR and $^{13}$C-NMR [$^1$H-NMR: δ4.6-4.8 (=CH$_2$ of 3,4-vinyl unit), 5.0-5.2 (—CH= of 1,4-unit), $^{13}$C-NMR: [δ23.4 (1,4-cis unit), 15.9 (1,4-trans unit), 18.6 (3,4-unit)]. Moreover, the number average molecular weight (Mn) and the molecular weight distribution (Mw/Mn) were determined by GPC using polystyrene as the standard substance.
(2) Weight Average Molecular Weight (Mw), Number Average Molecular Weight (Mn), and Molecular Weight Distribution (Mw/Mn)
Regarding the synthetic polyisoprene A to C and X to Z, the weight average molecular weight (Mw), number average molecular weight (Mn), and molecular weight distribution (Mw/Mn) of the synthetic polyisoprene in terms of polystyrene were determined by gel permeation chromatography [GPC: HLC-8220GPC made by Tosoh Corporation, column: 2 GMHXL columns made by Tosoh Corporation, detector: differential refractometer (RI)] with respect to monodisperse polystyrene. The measurement temperature was 40° C. THF was used as an eluting solvent.
(3) Rare Earth Element Content (Ppm) in Polymer
Regarding the synthetic polyisoprene A to C and X to Z, the rare earth element content (ppm) of the synthetic polyisoprene was determined using a wavelength dispersion type fluorescent X-ray apparatus [XRF-1700 made by Shimadzu Corporation] with respect to polyisoprene whose rare earth element content is known. Rh was used as an X-ray source, and the measurement was conducted under vacuum.

TABLE 1

|  | Ex. 1 Polymer A | Ex. 2 Polymer B | Ex. 3 Polymer C | Comp. Ex. 1 Polymer X | Comp. Ex. 2 Polymer Y | Comp. Ex. 3 Polymer Z |
|---|---|---|---|---|---|---|
| Polymerization solvent | Cyclohexane | Cyclohexane | Cyclohexane | Toluene | Chlorobenzene | Cyclohexane |
| Polymerization temperature | 25° C. | 50° C. | 50° C. | −40° C. | Ambient temp. | −20° C. |

TABLE 1-continued

|  |  | Ex. 1 Polymer A | Ex. 2 Polymer B | Ex. 3 Polymer C | Comp. Ex. 1 Polymer X | Comp. Ex. 2 Polymer Y | Comp. Ex. 3 Polymer Z |
|---|---|---|---|---|---|---|---|
| Molar ratio | Isoprene/component (a) | 130,000 | 130,000 | 130,000 | 200 | 2,400 | 4,900 |
|  | Component (c)/component (a) | 150 | 150 | 150 | 30 | 0 | 4 |
|  | Isoprene/component (c) | 867 | 867 | 867 | 6.7 | — | 1,225 |
| Activity (kg/mol · h) |  | 380 | 4,300 | 4,370 | 0.9 | 820 | 0.9 |
| Mw (×10³) |  | 2,280 | 2,345 | 2,070 | 2,135 | 553 | 2,452 |
| Mn (×10³) |  | 851 | 859 | 845 | 1,220 | 410 | 958 |
| Mw/Mn |  | 2.68 | 2.73 | 2.45 | 1.75 | 1.35 | 2.56 |
| Cis-1,4 bond content (%) |  | 96.7 | 96.5 | 98.5 | 99.6 | 98.5 | 98.4 |
| Rare earth element content (ppm) in polymer |  | 65 | 42 | 40 | >10,000 | >1,000 | 620 |

As shown in Table 1, polyisoprene with a high molecular weight and a high cis-1,4 bond content was obtained in Examples 1 to 3.

INDUSTRIAL APPLICABILITY

The synthetic polyisoprene produced by the disclosed producing method and a rubber composition including the synthetic polyisoprene are suitable for use in, for example, tire members (especially the tread member of the tire).

The invention claimed is:

1. An isoprene polymerization catalyst composition comprising:
   (a): a rare earth element compound having a rare earth element-oxygen bond or a rare earth element-sulfur bond;
   (b): an ionic compound; and
   (c): at least one compound selected from the group consisting of a compound represented by the following general formula (X) and a compound having a repeating unit represented by the following general formula (Y):

$$YR^1_a R^2_b R^3_c \quad (X)$$

$$(—Y(R^1)O—) \quad (Y)$$

wherein Y in the general formula (X) is a metal selected from groups 1, 2, 12 and 13 in a periodic table and Y in the general formula (Y) is a metal selected from group 13 in a period table, $R^1$ and $R^2$ are hydrocarbon groups with a carbon number of 1 to 10 or hydrogen atoms and $R^3$ is a hydrocarbon group with a carbon number of 1 to 10, wherein $R^1$, $R^2$ and $R^3$ are the same or different, and when a=1, b=0, and c=0, Y is the metal selected from the group 1 in the periodic table, when a=1, b=1, and c=0, Y is the metal selected from the groups 2 and 12 in the periodic table, and when a=1, b=1, and c=1, Y is the metal selected from the group 13 in the periodic table.

2. A method for producing a synthetic polyisoprene, which comprises polymerizing an isoprene monomer in the presence of an isoprene polymerization catalyst composition comprising:
   (a): a rare earth element compound having a rare earth element-oxygen bond or a rare earth element-sulfur bond;
   (b): an ionic compound; and
   (c): at least one compound selected from the group consisting of a compound represented by the following general formula (X) and a compound having a repeating unit represented by the following general formula (Y):

$$YR^1_a R^2_b R^3_c \quad (X)$$

$$(—Y(R^1)O—) \quad (Y)$$

wherein Y in the genera formula (X) is a metal selected from groups 1, 2, 12 and 13 in a periodic table and Y in the general formula (Y) is a metal selected from group 13 in a period table, $R^1$ and $R^2$ are hydrocarbon groups with a carbon number of 1 to 10 or hydrogen atoms and $R^3$ is a hydrocarbon group with a carbon number of 1 to 10, wherein $R^1$, $R^2$ and $R^3$ are the same or different, and when a=1, b=0, and c=0, Y is the metal selected from the group 1 in the periodic table, when a=1, b=1, and c=0, Y is the metal selected from the groups 2 and 12 in the periodic table, and when a=1, b=1, and c=1, Y is the metal selected from the group 13 in the periodic table.

3. The method for producing a synthetic polyisoprene according to claim 2, wherein the polymerization catalyst composition further comprises a component (D): a compound capable of being an anionic ligand.

4. The method for producing a synthetic polyisoprene according to claim 3, wherein the component (D) has at least one of a OH group, a NH group, and a SH group.

5. The method for producing a synthetic polyisoprene according to claim 2, wherein molar ratios of the isoprene monomer, the component (a), and the component (c) are that:
   (the isoprene monomer)/(the component (a)) is 5000 or more;
   (the component (c))/(the component (a)) is 10 or more; and
   (the isoprene monomer)/(the component (c)) is 5000 or less.

* * * * *